US008418006B1

(12) United States Patent
Trimberger

(10) Patent No.: US 8,418,006 B1
(45) Date of Patent: *Apr. 9, 2013

(54) PROTECTING A DESIGN FOR AN INTEGRATED CIRCUIT USING A UNIQUE IDENTIFIER

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/961,770

(22) Filed: Dec. 7, 2010

(51) Int. Cl.
*G01R 31/28* (2006.01)

(52) U.S. Cl.
USPC .......................................... 714/725; 716/111

(58) Field of Classification Search .................. 714/725; 716/101, 100, 111
See application file for complete search history.

(56) References Cited

U.S. PATENT DOCUMENTS

| 4,203,070 A | 5/1980 | Bowles et al. |
| 4,754,216 A | 6/1988 | Wong |
| 4,810,975 A | 3/1989 | Dias |
| 4,897,652 A | 1/1990 | Leon |
| 5,907,298 A | 1/1990 | Leon |
| 5,007,087 A | 4/1991 | Bernstein et al. |
| 5,276,734 A | 1/1994 | Hashimoto |
| 5,450,360 A | 9/1995 | Sato |
| 5,523,746 A | 6/1996 | Gallagher |
| 5,787,012 A * | 7/1998 | Levitt ............................ 716/101 |
| 5,828,678 A | 10/1998 | Mock |
| 5,838,256 A | 11/1998 | Pearson et al. |
| 5,952,933 A | 9/1999 | Issa et al. |
| 5,961,577 A | 10/1999 | Soenen et al. |
| 5,963,043 A | 10/1999 | Nassif |
| 5,964,881 A | 10/1999 | Thor |
| 5,970,142 A | 10/1999 | Erickson |
| 6,002,991 A | 12/1999 | Conn |
| 6,005,829 A | 12/1999 | Conn |
| 6,101,624 A | 8/2000 | Cheng et al. |
| 6,150,837 A | 11/2000 | Beal et al. |
| 6,161,213 A * | 12/2000 | Lofstrom .................. 324/750.15 |
| 6,185,126 B1 | 2/2001 | Rodgers et al. |
| 6,215,874 B1 | 4/2001 | Borza et al. |
| 6,230,270 B1 | 5/2001 | Laczko, Sr. |
| 6,233,339 B1 | 5/2001 | Kawano et al. |

(Continued)

OTHER PUBLICATIONS

U.S. Appl. No. 12/876,825, filed Sep. 7, 2010, Trimberger.

(Continued)

*Primary Examiner* — Yolanda L Wilson
(74) *Attorney, Agent, or Firm* — Steven Slater; John J. King; Lois D. Cartier

(57) ABSTRACT

An embodiment of the invention relates to an integrated circuit that includes an identifier reader which may be, e.g., a physically unclonable function reader that generates a unique and reproducible identifier for the integrated circuit, and a related method. An error correction code may be employed to correct an error in the value of the reproducible identifier. Values of signals in the integrated circuit are selectively inverted dependent on values of the reproducible identifier, and an error corrector uses the values of the reproducible identifier to restore the values of the signals. The signals may be produced as outputs of look-up tables that selectively invert the values of the signals dependent on the value of the reproducible identifier. The signals may be inputs to the integrated circuit, internal signals, outputs, or state data. A test may validate a state of the integrated circuit and disable operation if the test fails.

17 Claims, 10 Drawing Sheets

U.S. PATENT DOCUMENTS

| | | | |
|---|---|---|---|
| 6,260,146 | B1 | 7/2001 | Mos et al. |
| 6,298,453 | B1 | 10/2001 | Culbertson et al. |
| 6,351,814 | B1 | 2/2002 | Batinic et al. |
| 6,356,637 | B1 | 3/2002 | Garnett |
| 6,587,978 | B1 | 7/2003 | Merritt et al. |
| 6,604,214 | B1 | 8/2003 | Fukushima |
| 6,741,900 | B2 | 5/2004 | Tamura et al. |
| 6,791,353 | B1 | 9/2004 | Beal et al. |
| 6,816,825 | B1 | 11/2004 | Ashar et al. |
| 6,823,069 | B1 | 11/2004 | Kitajima et al. |
| 6,931,543 | B1 | 8/2005 | Pang et al. |
| 6,978,397 | B2 | 12/2005 | Chan |
| 7,191,339 | B1 * | 3/2007 | Trimberger ............... 713/185 |
| 7,200,235 | B1 * | 4/2007 | Trimberger ............... 380/277 |
| 7,240,218 | B2 | 7/2007 | Kean |
| 7,299,325 | B1 | 11/2007 | Waterhouse et al. |
| 7,380,131 | B1 * | 5/2008 | Trimberger ............... 713/193 |
| 7,565,541 | B1 | 7/2009 | Tarbouriech |
| 7,734,643 | B1 | 6/2010 | Waterhouse et al. |
| 8,176,072 | B2 | 5/2012 | Jayakody et al. |
| 8,218,859 | B2 | 7/2012 | Wang et al. |
| 2001/0032318 | A1 | 10/2001 | Yip et al. |
| 2002/0018561 | A1 | 2/2002 | Emelko |
| 2008/0270805 | A1 | 10/2008 | Kean |
| 2009/0303044 | A1 | 12/2009 | Furuichi et al. |
| 2010/0044438 | A1 | 2/2010 | Chen et al. |
| 2012/0158790 | A1 | 6/2012 | Chowdhury |

OTHER PUBLICATIONS

U.S. Appl. No. 11/101,076, filed Apr. 7, 2005, Trimberger.

U.S. Appl. No. 11/151,985, filed Jun. 14, 2005.

U.S. Appl. No. 12/961,753, filed Dec. 7, 2010, Trimberger.

U.S. Appl. No. 12/962,566, filed Dec. 7, 2010, Trimberger.

Ajluni, Cheryl, "Give Your IP a Unique ID With Silicon Fingerprinting," *Electronic Design*, Feb. 7, 2000, pp. 1-2, Penton Media, Inc., New York, New York, USA.

Eastlake, D. et al., *Randomness Recommendations for Security*, Dec. 1994, RFC 1750, downloaded Jan. 27, 2005 from www.faqs.org/rfcs/rfc1750.html, pp. 1-24.

IBM Corporation, *Integrated Circuit Compatible Random Number Generator*, IBM Technical Disclosure Bulletin, TBD-ACC-No. NN8804333, Apr. 1, 1998, vol. 1, Issue No. 11, pp. 333-335.

Intrinsic-ID, Inc., *Quiddikey*, downloaded Sep. 15, 2010 from www.intrinsic-id.com/products, Intrinsic-ID, Inc., San Jose, California, USA.

Suh, G. Edward et al., "Physical Unclonable Functions for Device Authentication and Secret Key Generation," *Proc. of the 44th ACM/IEEE Design Automation Conference*, Jun. 4, 2007, pp. 9-14, ACM, New York, New York, USA.

XILINX, Inc., *The Programmable Logic Data Book 1998*, (v1.4), Chapter 4, Nov. 10, 1997, pp. 4-1 to 4-374, Xilinx, Inc., San Jose, California, USA.

XILINX, Inc., *Using Look-Up Tables as Shift Registers (SRL16) in Spartan-3 Generation FPGAs*, XAPP465 (v1.1), May 20, 2005, pp. 1-17, Xilinx, Inc., San Jose, California, USA.

U.S. Appl. No. 13/082,271, filed Apr. 7, 2011, Trimberger.

* cited by examiner

PROTECTING A DESIGN FOR AN INTEGRATED CIRCUIT USING A UNIQUE IDENTIFIER

CROSS-REFERENCE TO RELATED APPLICATION

This application relates to the following co-pending and commonly assigned patent application: Ser. No. 12/961,753, filed on the same day as the present application, entitled "UNIQUE IDENTIFIER DERIVED FROM AN INTRINSIC CHARACTERISTIC OF AN INTEGRATED CIRCUIT", which application is hereby incorporated herein by reference.

FIELD OF INVENTION

An embodiment of the invention relates generally to protection of intellectual property in integrated circuit devices and methods, and more particularly to using an identifier for protection of intellectual-property in an integrated circuit.

BACKGROUND

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAM"), multipliers, digital signal processing blocks ("DSPs"), processors, clock managers, delay lock loops ("DLLs"), and so forth. CLBs commonly comprise look-up tables ("LUTs") to implement Boolean logic, registers and arithmetic logic. A LUT is a multiple-input memory representing a truth-table of the logic function to be performed. Therefore, a LUT can implement any function of its inputs. Further, it is easy to change the function of a LUT by simply changing the truth table it contains. The functionality of a LUT is limited by the number of its inputs. A common LUT size for an FPGA has four inputs, but other sizes have been built, including three inputs and six inputs.

Each programmable device typically includes both programmable interconnects and programmable logic. The programmable interconnects typically include a large number of interconnect lines of varying lengths interconnected by programmable interconnect points ("PIPs").

The programmable logic implements the logic of a user design using programmable elements that can include, for example, function generators, registers, arithmetic logic, and so forth.

The user design comprises logic functions, such as logic gates, registers, state machines, memories, microprocessors and input/output pins. In a compilation step, logic in the user design is mapped to the logic elements of the PLD LUTs. Wires in the user design are mapped to the programmable interconnects of the PLD to make electrical connections to the blocks where the user logic was mapped.

The programmable interconnect and programmable logic are typically programmed by loading a stream of configuration data into internal configuration memory cells that define how the programmable elements are configured. The configuration data can be read from memory (e.g., from an external programmable read-only memory ("PROM")) or written into an FPGA by an external device. The collective states of the individual memory cells then determine the function of the FPGA.

Another type of PLD is the Complex Programmable Logic Device, ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs and FPGAs, configuration data is stored on-chip in non-volatile memory, then downloaded to volatile memory as part of an initial configuration (programming) sequence. In some CPLDs and FPGAs, non-volatile memory controls programmable interconnects and logic directly.

For all of these PLDs, the functionality of the device is controlled by data bits provided to the device for that purpose. The data bits can be stored in volatile memory (e.g., static memory cells), in non-volatile memory (e.g., FLASH memory), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or anti-fuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Semiconductor integrated circuits such as processors, FPGAs, and application-specific integrated circuits ("ASICs") require a substantial amount of development resources for their design. Integrated circuits such as FPGAs are commonly used in high-volume applications such as for processing video signals, decoding audio signals, etc. An issue in the marketplace is the ease with which such devices can be reverse engineered and then reproduced with much less effort than that required for their original development. To protect the intellectual property inherent in such devices, researchers have described embedding a non-volatile chip identifier on the semiconductor device, and to insert into the user function a check for the proper chip identifier to protect the design against unauthorized reproduction.

Recognizing that a chip identifier can be economically embedded in an integrated circuit such as a PLD, it is not known how to implement a process that is simple to implement yet robust for protecting a logical function implemented in the integrated circuit. In a known straightforward process, a bitstream is loaded to read the chip identifier, and then the chip identifier is recorded in the bitstream or other external storage to provide a validity check for the integrated circuit. But a reverse-engineering effort can detect the location of the validity check and disable it. If the validity check is just a 32-bit compare operation with a single "OK" bit output, it would be relatively easy for an attacker to find and remove the validity check, for example, by just setting the "OK" signal to "TRUE." The general approach used by a vendor to provide intellectual property protection for an integrated circuit such as a PLD can often be easily obtained by the outside design community.

Accordingly, there is a need for a process and related method to implement protection of an integrated circuit against unauthorized reproduction that is simple to implement because it may be applied to every instance of the die, and the resulting device should be substantially immune to reverse engineering, thereby avoiding disadvantages of conventional approaches for protecting unauthorized reproduction of an integrated circuit.

SUMMARY

In accordance with an exemplary embodiment, a method to protect a design for an integrated circuit ("IC") is provided. In this embodiment, the method includes generating a unique identifier using an intrinsic characteristic of the IC, and integrating, based on a value of the unique identifier, the unique identifier with the design or a next state associated with the design. In this embodiment, the method can include employing an error correction code to correct the unique identifier prior to the integrating the unique identifier with the design or the next state. In this embodiment, integrating the unique identifier with the design can include EXCLUSIVE ORing a portion of the design with a portion of the unique identifier to produce a result, and inverting the result of the EXCLUSIVE ORing based on a value of the portion of the unique identifier, where the inverting is performed prior to performing a logic operation. In this embodiment, integrating the unique identifier with the design can include EXCLUSIVE ORing a portion of the unique identifier with an output of user logic to produce a result, and inverting the result of the EXCLUSIVE Oring at a destination of the result of the EXCLUSIVE Oring based on a value of the portion of the unique identifier. The integrating the unique identifier with the next state can include inverting the next state based on a value of the unique identifier in order to generate an inverted next state, and EXCLUSIVE ORing the inverted next state with the unique identifier to reobtain the next state. In this embodiment, the inverting the next state can further include inverting a bit of the next state if a corresponding bit of the unique identifier has a value of "1". The embodiment can further include performing a test on the next state to validate the next state, and disabling an operation of the IC if the test fails. The next state can be represented as a one-hot bit sequence, and the test validates that only one bit of the one-hot bit sequence has a value of "1." In this embodiment, the unique identifier can be a physically unclonable function. In this embodiment, the unique identifier can be generated with a linear feedback shift register.

In accordance with a further exemplary embodiment, a method to protect a design for an IC is provided. In this embodiment, the method includes generating a unique identifier using an intrinsic characteristic of the IC; generating a response value based on a state value associated with the design, where the response value is a portion of the unique identifier; correcting the response value; and converting the corrected response value to a next state associated with the design. In this embodiment, correcting the response value can include employing an error correction code to correct at least one error in the response value, or detecting the at least one error in the response value and reporting the at least one error. The converting the corrected response value to the next state of the IC can include using the corrected response value as an address to a memory, where a content of the memory at the address specifies the next state of the IC. The state value can be a current state or the next state. The unique identifier can be a physically unclonable function.

In accordance with yet another embodiment, a system to protect a design for an IC includes an identifier reader configured to generate a unique identifier using an intrinsic characteristic of the IC; and an integration device configured to integrate, based on a value of the unique identifier, the unique identifier with the design or a next state associated with the design. In this embodiment, the integration device includes: an EXCLUSIVE-OR gate configured to EXCLUSIVE-OR a portion of the design with a portion of the unique identifier; and a user logic, coupled to the EXCLUSIVE-OR gate, configured to perform a logic operation, where the user logic optionally includes an inverter that is present based on a value of the portion of the unique identifier, where the inverter, if present, inverts an output from the EXCLUSIVE-OR gate prior to the user logic performing the logic operation. The integration device can further include: a user logic; an EXCLUSIVE-OR gate configured to EXCLUSIVE-OR an output of the user logic with a portion of the unique identifier; and a destination user logic, coupled to the EXCLUSIVE-OR gate, where the destination user logic optionally includes an inverter that is present based on a value of the portion of the unique identifier, where the inverter, if present, inverts an output from the EXCLUSIVE-OR gate prior to the destination user logic performing a logic operation. In this embodiment, the integration device can include: an inverter block configured to invert the state value based on a value of the unique identifier in order to generate an inverted state value; and an EXCLUSIVE-OR device, coupled to the inverter block, configured to EXCLUSIVE-OR the inverted state value with the unique identifier.

In accordance with a further exemplary embodiment, a system to protect a design for an IC includes an identifier block configured to generate a response value based on a state value associated with the design, where the response value is a portion of an unique identifier that is generated using an intrinsic characteristic of the IC; and a correction block configured to correct the response value and convert the corrected response value to a next state associated with the design. In this embodiment, the correction block can correct the response value by: employing an error correction code to correct at least one error in the response value, or detecting the at least one error in the response value and reporting the at least one error. The state value can be a current state or the next state.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, and may be described only once in the interest of brevity. For a more complete understanding of the invention, reference is now made to the following descriptions taken in conjunction with the accompanying drawings, in which:

DETAILED DESCRIPTION

Figure 1:
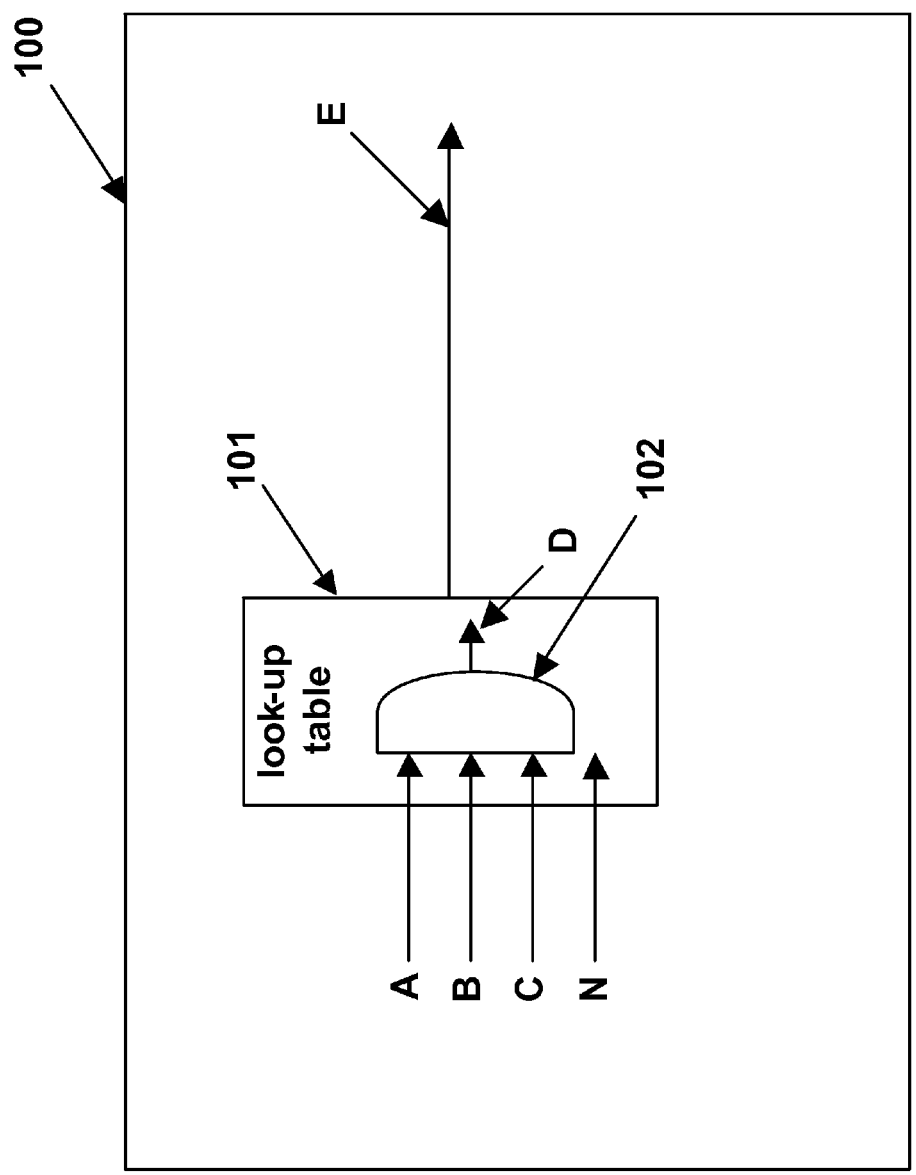
FIG. 1 illustrates a drawing of a conventional look-up table formed in an integrated circuit such as a programmable logic device.

The making and using of one or more embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a process for protection of an integrated circuit against unauthorized reproduction or utilization by selectively inverting a value of a chip signal, wherein the inversion is dependent on a value of a reproducible chip identifier. The proper value of the chip signal is then restored afterwards by an error corrector employing the value of the chip identifier.

An embodiment of the invention may be applied to an arrangement for protection of an integrated circuit against unauthorized reproduction or utilization, for example, to a programmable logic device including a configurable logic block. As an example, the integrated circuit can be an FPGA. Other arrangements and applications for protection against unauthorized reproduction or utilization can be constructed and applied using processes as introduced herein in different contexts using inventive concepts described herein, for example, to an application-specific integrated circuit ("ASIC") or to other signal processing or memory devices. Such a device will be referred to herein simply as a programmable logic device or PLD.

A program for an integrated circuit such as a PLD is often stored in an external memory device, for example in a flash drive or other nonvolatile memory device that will be used to program the PLD. When such an integrated circuit is powered up, it is essentially an unprogrammed, general-purpose device, and a program, i.e., a configuration bitstream, is loaded into the integrated circuit from the external memory device to provide its functionality for a particular application. The program that is loaded into the integrated circuit establishes the logic functions performed by the integrated circuit, as well as the "wiring" that establishes how the logic functions are coupled to each other. The integrated circuit may include random access memory ("RAM") that holds the program that controls the logic functions. The external memory device may be an external server or, more commonly, an external flash drive that holds the program.

As noted above, a program for an integrated circuit is an embodiment of a substantial amount of intellectual property that was required for its design, representing a considerable capital investment. An option to provide program protection for the integrated circuit or other digital device is to employ a physically unclonable function ("PUF"). Such a PUF would be unique in that a substantial number of degrees of freedom would be inherent in the creation of the PUF value. It would be tamper resistant so that the output of the PUF would be sensitive to small changes when manufacturing the device. It would also be unforgeable so that copies of the device could not be practically produced.

For example, a memory structure can be included on an integrated circuit that produces a random binary sequence that is different from chip to chip, but is essentially the same binary sequence for the particular chip each time it is powered up. It is expected that there will be a small variation in the binary sequence each time the particular chip is powered up, particularly as the chip ages, or as its temperature, voltage, or other environmental parameter varies. Thus, the contents of the memory structure on a particular chip will be mostly but not completely repeatable. Various techniques are well known in the art to employ oscillators or memory structures that generate a unique and mostly repeatable binary sequence each time the chip is powered up. For example, a memory structure dependent on chip-dependent threshold voltages of MOSFETs may be employed to generate a unique and mostly repeatable binary sequence. Such a binary sequence, which is often 256 bits long or longer, provides a "fingerprint" for a particular chip that is very difficult to clone, even by an authorized device manufacturer. Oscillators can have frequencies that are slightly variable from chip to chip. The frequencies of oscillators or differences in frequencies of oscillators may be employed to generate a mostly repeatable chip identifier value.

A chip identifier used as a password or decryption key must be accurately reproducible for the particular chip to provide reliable program decryption or enablement, or for decryption of a data stream transmitted to or processed within the integrated circuit during normal device operation. The identifier must be completely unvarying and stable (i.e., accurately reproducible) over the life of the chip to enable accurate and repeatable execution of the decryption or enablement process. A technique to produce an accurately reproducible identifier for an integrated circuit such as a programmable logic device employs check bits in an error correction code, as described by S. M. Trimberger in U.S. Pat. No. 7,191,339, entitled "System and Method for Using a PLD Identification Code," issued Mar. 13, 2007 ("Trimberger"), which is hereby incorporated herein by reference. An inaccurate PUF value may be corrected by an error correction process such as an error correction code to accurately reproduce the chip identifier.

As introduced herein, a value of a reproducible identifier such as a particular identifier bit is EXCLUSIVE ORed with a digital signal in an integrated circuit to selectively invert the digital signal or a bit thereof depending on the value of the identifier. An error corrector uses the value of the identifier to restore or otherwise correct the value of the digital signal. Thus, the result of the EXCLUSIVE OR operation is inverted, i.e., restored or corrected, by the error corrector prior to inputting data to a subsequent function if the value of the identifier is "1."

Various processes may be employed to ensure stability of an uncertain identifier such as a PUF value, such as a process described in co-pending application entitled "UNIQUE IDENTIFIER DERIVED FROM AN INTRINSIC CHAR- ACTERISTIC OF AN INTEGRATED CIRCUIT," Ser. No. 12/961,753, cited previously hereinabove. In descriptions of embodiments contained hereinbelow, a chip "identifier" will be understood to be a reproducible identifier. A reproducible identifier may be obtained from a raw identifier value employing techniques such as an error correction code.

Insubstantial impact on chip area and performance can be advantageously achieved by choosing a signal in the integrated circuit design that is used in a look-up table that has an unused input. The value of the identifier such as a particular bit thereof does not change during normal integrated circuit operation, so there is no associated performance requirement, i.e., it can be set in a slow or start-up program route. An entire identifier bit check can be absorbed into a single look-up table, as described further hereinbelow.

Turning now to FIG. 1, illustrated is a drawing of a conventional look-up table 101 formed in integrated circuit 100 such as a programmable logic device. The exemplary LUT 101 has four inputs to facilitate the description, though other size LUTs with a different number of inputs (e.g., three or six) may be used. The PLD is programmed with a circuit comprising an exemplary internal logical gate, such as the AND gate 102, that provides an internal signal D that is the result of a logical AND operation performed on three inputs A, B, and C. AND gate 102 is mapped during the compilation step to LUT 101 of the PLD. AND gate 102 has three inputs, so the input N of the LUT is unused. The output signal of look-up table 101 that depends on the internal signal D is the signal E.

Figure 2:
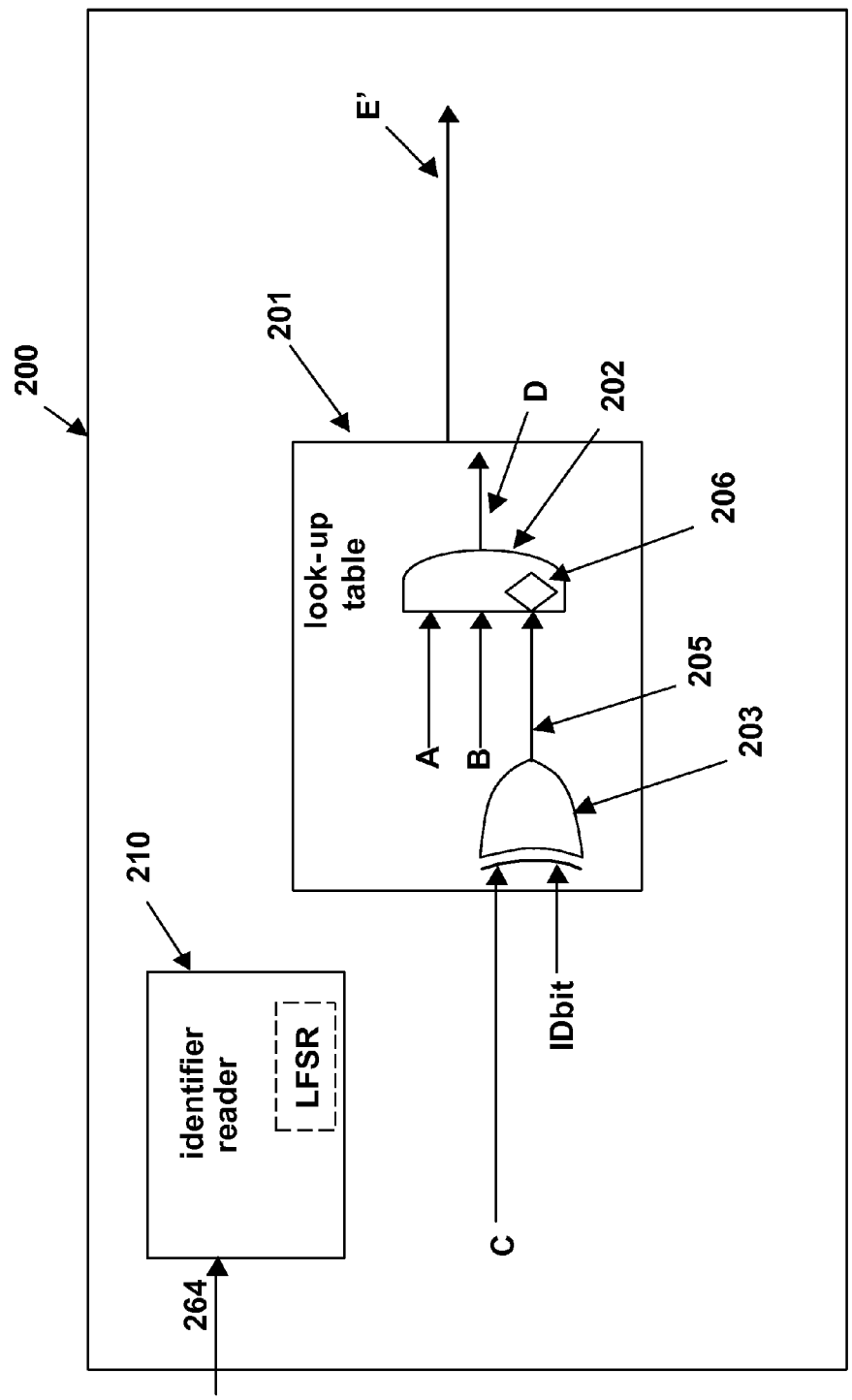
FIG. 2 illustrates a drawing showing a look-up table formed in an integrated circuit such as a programmable logic device, constructed according to an embodiment.

Turning now to FIG. 2, illustrated is a drawing showing a look-up table 201 formed in an integrated circuit 200 such as a programmable logic device, constructed according to an embodiment. The integrated circuit 200 includes an identifier reader 210 to generate a unique and reproducible value of a chip identifier. In an embodiment, the identifier reader 210 may accept a password from an external (from the chip) connection 264. The password may be sent encrypted. The chip identifier may be the password or may be derived from the password. In an embodiment, the identifier reader 210 may include a non-volatile memory. In another embodiment, the identifier reader 210 may generate a PUF value that requires no external connection. In a further embodiment, the chip identifier may be formed with an e-fuse. The identifier reader 210 may include an error correction process such as an error correction code. The look-up table 201 implements user logic such as, e.g., a modified logical AND operation 202 on the inputs A, B, and 205 to produce the internal signal D. The modified logical AND operation 202 includes an inverter 206 that selectively inverts the value of the input 205 before the logical AND operation is performed, and when the actual value of the identifier is known (e.g., during system build). The inverter 206, represented in the figure by the diamond, is inserted into the AND operation 202 if the value of the bit of the identifier associated with the input C for this specific chip is "1." Otherwise, the inverter 206 is omitted. Thus the inverter will be present in some specific chips and absent in others. The input C is coupled to an input of EXCLUSIVE OR gate 203, and an IDbit dependent on the value of the bits of the identifier that may be produced off chip associated with the input C is coupled to the other input of EXCLUSIVE OR gate 203. Thus, a logical AND operation similar to that illustrated in FIG. 1 is performed that is now dependent on the value of the identifier associated with the input C. The signal on input C was chosen because the look-up table 201 to which it was mapped has an unused input. Any of the three inputs would work equally well because LUT 201 implements any function of its inputs. In some PLDs, logic is implemented with fixed-function gates or restricted logic blocks. In these PLDs, the choice of the signal to be controlled will be limited by the flexibility of the logic block.

The input C may be chosen after mapping or compilation of the device. The output signal of look-up table 201 that depends on the internal signal D is the signal E'. In another embodiment, a logical OR or other logical operation may be employed in the integrated circuit in place of the logical AND operation 102.

The change in coding of the look-up table is a simple inversion of the value of the input C in the look-up table encoding according to the value of the associated bit of the identifier. If the identifier bit is a logic "1" for this chip, the input C is inverted. Because a LUT contains a truth table of a function, such a coding change can be easily done for a particular integrated circuit such as an FPGA. The result is a device with the same logical structure, dependent on the chip identifier and with minimal signal re-routing within the device. The changes can be performed automatically after the specific chip is chosen.

If an attempt were made to make an unauthorized copy of the user design and to load the user design into a different device, the chip identifiers of the two chips would differ. Because of the insertion of the EXCLUSIVE OR gate and the inversions for the signals EXCLUSIVE ORed with "1" bits of the chip identifier, these modified signals would produce an incorrect result. The user design will only function correctly in the chip with the correct chip identifier.

Any number of signals can be EXCLUSIVE ORed with the value of an associated bit of an identifier. Multiple identifier bits can be used and re-used with different signals. The greater the number of signals that are EXCLUSIVE ORed with associated bits of the identifier, the greater the difficulty for an adversary to copy the intellectual property contained within the device.

As a further enhancement for chip security, it is generally desirable to have approximately an equal number of "0" and "1" bits in a chip identifier. A value of an identifier with a large number of zeros and only a few ones, or vice versa, can be readily broken by an attacker by trying a relatively modest number of code combinations. To ensure approximately equal numbers of "0" and "1" bits, the value of the identifier can be cycled in a linear feedback shift register ("LFSR"), e.g., for a fixed number of cycles such as 1000 cycles. The linear feedback shift register is an optional element in the identifier reader 210 to provide enhanced protection. The design of a linear feedback shift register such as a maximum length linear feedback shift register based on a primitive polynomial is well known in the art and will not be further described herein in the interest of brevity. Another method for ensuring approximately equal numbers of "0" and "1" bits is to run the device ID through an encrypter. Other methods may also be used.

Figure 3:
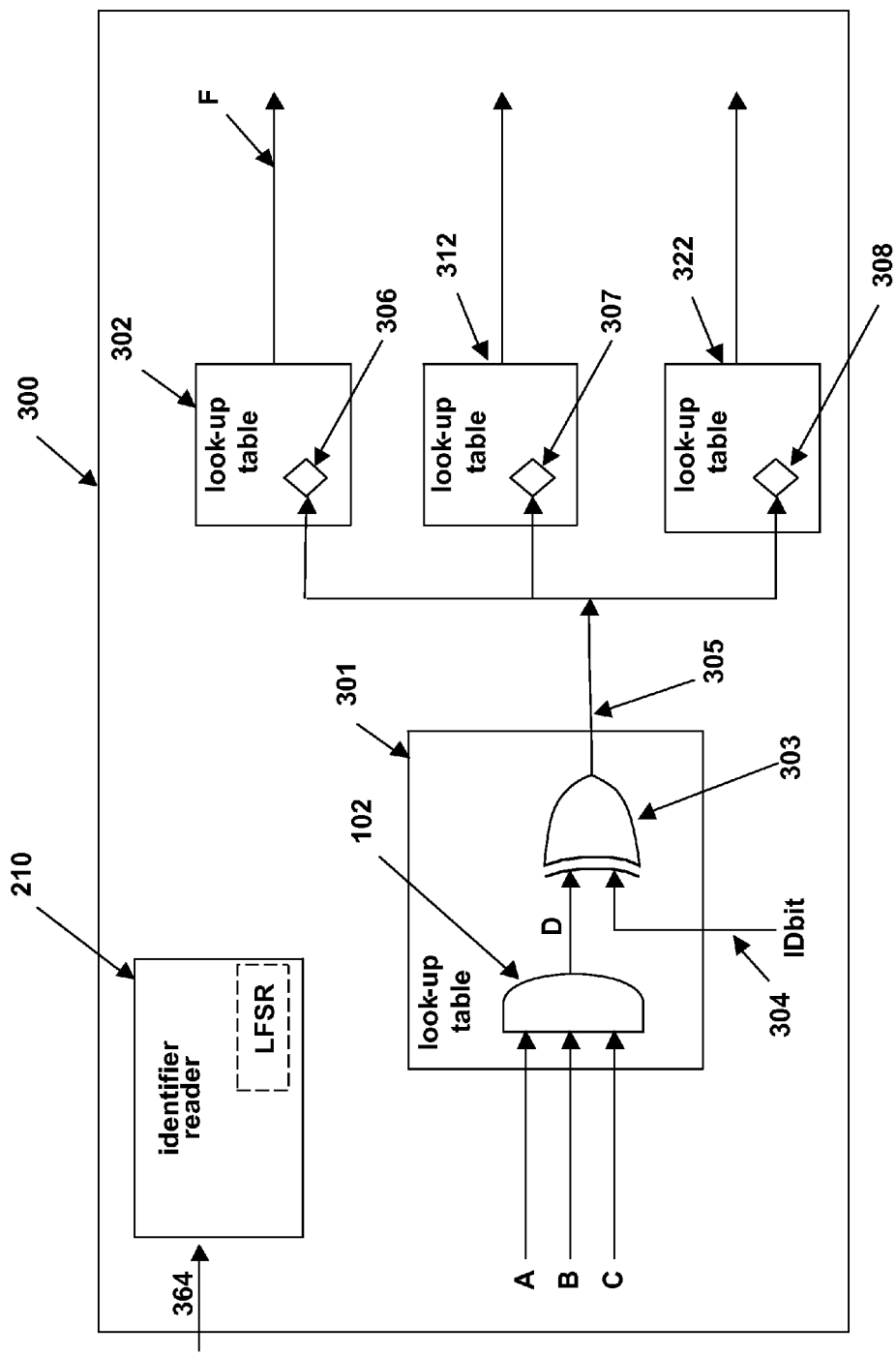
FIG. 3 illustrates a drawing of a look-up table formed in an integrated circuit such as a programmable logic device, wherein an internal signal of a logical function is EXCLUSIVE ORed with the value of an associated bit of a chip identifier, constructed according to an embodiment.

Turning now to FIG. 3, illustrated is a drawing of a look-up table 301 formed in an integrated circuit 300 such as a PLD, wherein an internal signal D of a logical function, such as a logical function performed with a look-up table, is EXCLUSIVE ORed with the value of an associated bit of an identifier, constructed according to an embodiment. The look-up table 301 performs a logical AND operation 102 on the inputs A, B, and C to produce the internal signal D as described previously hereinabove with reference to FIG. 1. The logical AND operation 102 is coupled to an input of EXCLUSIVE OR gate 303 that provides an EXCLUSIVE OR operation dependent on IDbit 304 derived from a value of an identifier that is coupled to another input of the EXCLUSIVE OR gate 303. The output 305 produced by look-up table 301 is coupled to one or more destination look-up tables such as destination look-up table 302. The destination look-up tables each may include an inverter, each inverter represented in the figure by a diamond such as inverters 306, 307, and 308 that invert the value of the signal on output 305. These inverters are inserted in the destination look-up tables if an associated bit of the identifier for this specific chip has value "1." Otherwise, the respective inverter is omitted from the destination look-up table. The output F of the destination look-up table 302 is thereby produced with the same logical structure that would be obtained without the EXCLUSIVE OR gate 303 and without the inverter 306. However, the output F is now dependent on the value of the particular bit of the identifier for this specific chip. Similarly, inverters 307 and 308 are included in the other destination look-up tables 312 and 322. Thus, and without limitation, a logical AND operation similar to that illustrated in FIG. 1 is performed that is now dependent on the value of the identifier.

Destination look-up tables such as the look-up table 302 (or other destination logical structure) have inverters inserted in their coding if the bit of the identifier is a "1." This embodiment separates the identifier EXCLUSIVE OR process from the logic that re-inverts it, making a reverse-engineering search by an adversary more difficult. Thus, there is no simple signal for an "OK" bitstream that can be easily set by an adversary. To break the protection process dependent on the value of the identifier, the adversary must reverse-engineer the entire logical design, which is generally an intractable option.

The identifier reader 210 illustrated in FIGS. 2 and 3 is inherently included in one or more embodiments of an integrated circuit design described herein, and may not be illustrated in subsequent Figures for simplicity of presentation. Such identifier readers may be formed with an error correction code or other process to assure a stable, correct chip identifier value such as a PUF value, and may include a linear feedback shift register to produce a relatively equal number of "0s" and "1s." In an embodiment, the identifier reader may accept a password externally from the chip from external connection 364. The password may be sent encrypted. The chip identifier may be the password or may be derived from the password.

Figure 4:
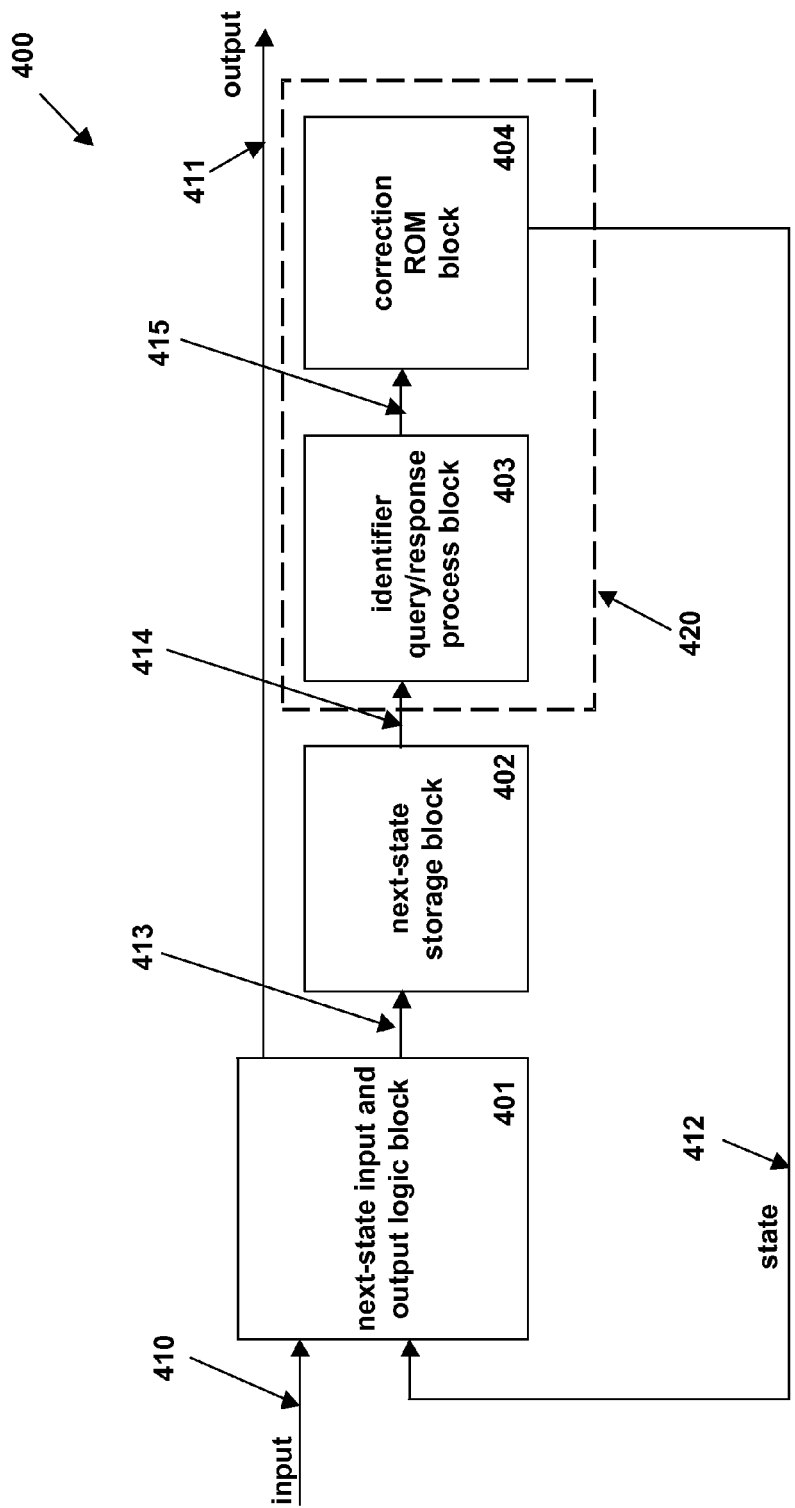
FIGS. 4, 5, and 6 illustrate block diagrams of an integrated circuit such as a programmable logic device wherein an identifier query/response process is integrated into a chip state machine, constructed according to an embodiment.

Turning now to FIG. 4, illustrated is a block diagram of an integrated circuit 400 such as an FPGA wherein an identifier query/response process block ("identifier block") 403 is integrated into a state machine, constructed according to an embodiment. The integrated circuit 400 includes an identifier reader similar to the identifier reader 210 illustrated in FIG. 2, but the identifier reader is not shown in FIG. 4. Similarly, the embodiments illustrated in FIGS. 5-8 described hereinbelow include an identifier reader, and the identifier reader is not shown in these figures. In a general PLD design, encoding of the state of the state machine is somewhat arbitrary, and such variability among designs does not significantly impact embodiments described herein.

An input 410 and the current state 412 of the integrated circuit 400 is coupled to the next-state input and output logic block ("next-state block") 401. Next-state block 401 represents a basic processing function performed by the integrated circuit to produce the output 411. Next-state block 401 computes outputs 411 and next-state 413 from inputs 410 and state 412. Next-state 413 of next-state block 401 is coupled to the next-state storage block 402. Next-state block 401 and next-state storage block 402 represent elements of a conventional state machine design. In the conventional design, next-state 414 is fed-back to the next-state block 401 rather than state 412.

According to some embodiments, new logic 420 including identifier block 403 and correction read-only memory ("ROM") block 404 is added to the conventional state machine design, represented by the elements inside the dashed line in FIG. 4. Rather than directly using state bits to calculate the next state and output logic, the next-state 414 is used to challenge, i.e., provide input to, the identifier block 403. The identifier block 403, which may be a PUF, generates a different response 415 for each data-bit challenge (that is, for each next state 414), i.e., for data representing each state presented to the identifier block 403 by the next-state storage block 402. Thus, a sequence of identifier bits is selected, without limitation, in response to a value of a state of the integrated circuit. In an embodiment, the sequence of identifier bits is selected in response to a value of an input to the integrated circuit.

The state (e.g., next state 413 or next state 414) of the integrated circuit may be encoded in various formats. An exemplary format is a "one-hot" format, wherein only one bit in a word of length "n," such as a 16-bit word, is set to the value "1" to represent a particular state. Thus, there are at most "n" possible states in this representation. In a "two-hot" format, two bits in a word of some length "n" are set to the value "1" to represent a particular state. Thus, as many as $n(n-1)/2$ states can be represented by a word of length "n." A fully-encoded field of n bits can represent $2^n$ states. All that is required is that each state has a unique representation.

In an embodiment, the identifier bits employed in identifier block 403 are stored as a sequence of words in a table in memory of the integrated circuit 400. For example, the memory may be uninitialized in order to take on an initial value that depends on manufacturing variations. So while each specific chip will have a different value, the value on a specific chip will be relatively stable. An error-correction mechanism can be applied to contribute to stability. The table in identifier block 403 is accessed by an index, i.e., next-state 414, and a resulting identifier word, such as a "word1," "word2," etc., of the table, may be read out. The identifier challenge input is thus the next-state 414 to the identifier block 403. The words of the table each represent a portion of an identifier value that is random across chips but reproducible for a particular chip. The response 415 output from the identifier block 403 is the particular entry in the table accessed by the identifier challenge. Thus, the identifier block 403 represents a process that produces a chip-dependent response to an input for each state that is irreproducible by an adversary. The identifier block 403 produces results that are unrelated to the next state 414, and different from one chip to the next, but are reproducible on a specific chip.

An embodiment to form the identifier block 403 may be constructed using a delay PUF, constructed as a series of multiplexers creating a race condition on a register. The PUF challenge controls the multiplexers that select the paths in the race condition. Structures employing multiplexers or other circuit elements to produce an identifier value dependent on an input are well known in the art and will not be further described herein in the interest of brevity.

The correction ROM block 404 converts the output of identifier block 403 to the correct next state for the state machine, i.e., the next state without inverted bits. In a PLD, this function may be performed as a look-up in a BRAM for ease of implementation. It is recognized that data and logic stored in this process do not change during the operational phase of an integrated circuit, and thus this function in correction ROM block 404 is identified, without limitation, as a ROM in FIG. 4.

The correction ROM block 404 performs one or more of the following functions:

1) Correction of any identifier error bits using an error correction code or other error-correction mechanism to produce stable identifier bits, as described in co-pending patent application with Ser. No. 12/961,753, cited previously hereinabove.

2) Conversion of the identifier response to the correct next state of the integrated circuit. In an embodiment, the identifier response is presented as an address to the BRAM.

3) Detection of erroneous identifier values to generate an identification failed ("ID failed") signal. An erroneous identifier value will generally produce a random sequence of erroneous state transitions, rendering the integrated circuit inoperable. Detection of an erroneous identifier value is an optional process that may be included to protect the integrated circuit or devices to which it is coupled from a destructive result from a failed integrated circuit or identifier-related computation. Such an optional process would generally be included to protect an end user from such errors, even errors introduced by an unauthorized copy produced by an adversary.

Detection of an erroneous identifier value by itself may provide a clue to an unauthorized user for operation of the integrated circuit. However, it is anticipated that an automated process will be employed to add logic as described hereinabove to the integrated circuit. Manual detection and removal of such logic, especially a substantial amount of logic widely distributed across a number of elements of the integrated circuit, will render unauthorized use impractical. The likelihood is small of somebody finding and properly altering the added logic. As a further deterrent, the next-state logic need not be based on an orderly or obviously numbered sequence of states. It is expected that it will be an impractical task for an unauthorized user to just remove the elements in new logic 420 to produce an unauthorized copy.

Since state bits are generally fewer in number than an identifier, i.e., tens of state bits instead of hundreds of identifier bits, the operation performed in identifier block 403 allows a designer to effectively generate hundreds or thousands of identifier bits to represent the many states of the state machine formed in the integrated circuit, yielding greater security. The identifier block 403 may generate more bits or fewer bits than the number of state bits. State 412 and next-state 413 or next-state 414 need not be identical values for the same state. For example, block 401 may generate a value of 25 for the next-state. That value may be used to look up a result in block 403 and corrected, not to 25, but to 5. Of course, block 401 must be designed to accept 5 for a state as input and generate a 25 for that state on its output. By using different values for state and next state, an adversary trying to circumvent the checking 420 cannot simply connect 414 to 412.

For performance reasons, identifier block 403 may rely on several PUF structures. For example, to generate twenty identifier bits, twenty independent structures may be operated in parallel, each structure generating one identifier bit. Thus, an identifier block need not be constructed as a single structure, but can be constructed as a plurality of structures operating in parallel or serially to produce a plurality of identifier bits. And the plurality of identifier structures need not all be the same. Some structures could be memory based, and some could be multiplexer or oscillator based to produce the identifier data.

From a general perspective, the next-state block 401 described with reference to FIG. 4 can be implemented simply as a memory structure where an index accessing the elements of the memory is produced by a concatenation of input data 410 and the current state 412 of the process. The memory elements represent the output 411 and the next state 413 of the process. A memory structure employing such a table look-up avoids the conceptual need for "logic gates." In a PLD, the memory structure may be a BRAM (e.g., BRAM 1003 of FIG. 10 below) for the correction ROM block 404. A table look-up, and the next state block 401 can be implemented as a single BRAM or as a sequence of BRAMs depending on the size of the state machine.

Figure 5:
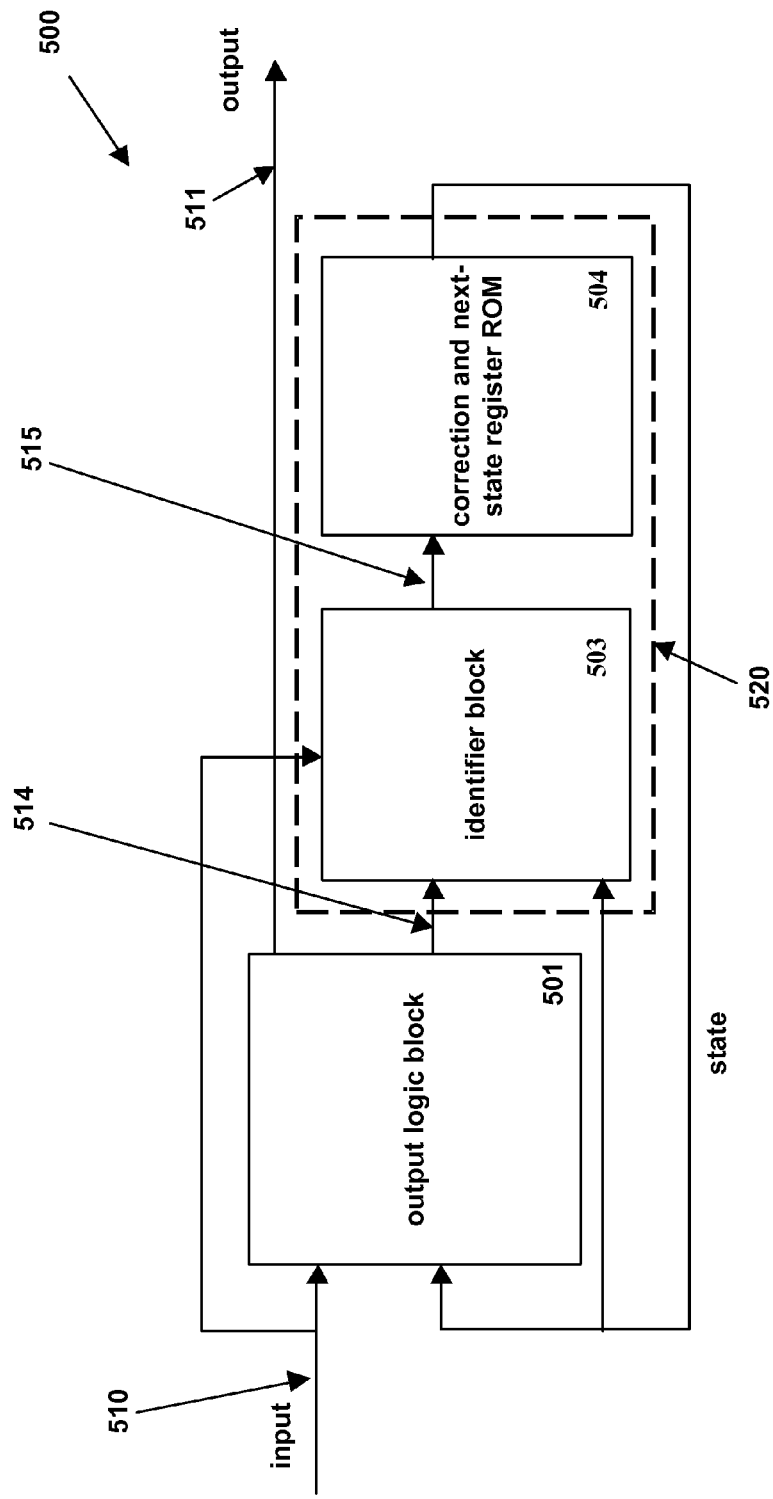

Turning now to FIG. 5, illustrated is a block diagram of an integrated circuit 500 such as a PLD wherein an identifier query/response process represented by the identifier block 503 is integrated into a state machine, constructed according to an embodiment. In this embodiment, the output computation, i.e., the computation of the next-state block 401 and the next-state storage block 402 as previously illustrated and described hereinabove with reference to FIG. 4 are separated into output logic block 501, which computes the state machine outputs from the inputs and the current state. The next-state 413 from the next state block 401 and the state 412 from the correction ROM block 404 are now merged into correction and next-state register ROM 504. The BRAM may be clocked, enabling storage of the state register, shown as next-state storage block 402 in FIG. 4, in the clocking of the BRAM of the correction and next-state register ROM 504. And rather than directly using state bits to calculate the next state and output logic, data-bit challenge 514 is used to challenge, i.e., provide input to, the identifier block 503. The identifier block 503, which may be a PUF, generates a different response 515 for each data-bit challenge 514, i.e., for data representing each state presented to the identifier block 503 by the output logic block 501. Thus, a sequence of identifier bits is selected, without limitation, in response to a value of a state of the integrated circuit. In an embodiment, the sequence of identifier bits is selected in response to a value of an input to the integrated circuit.

Figure 6:
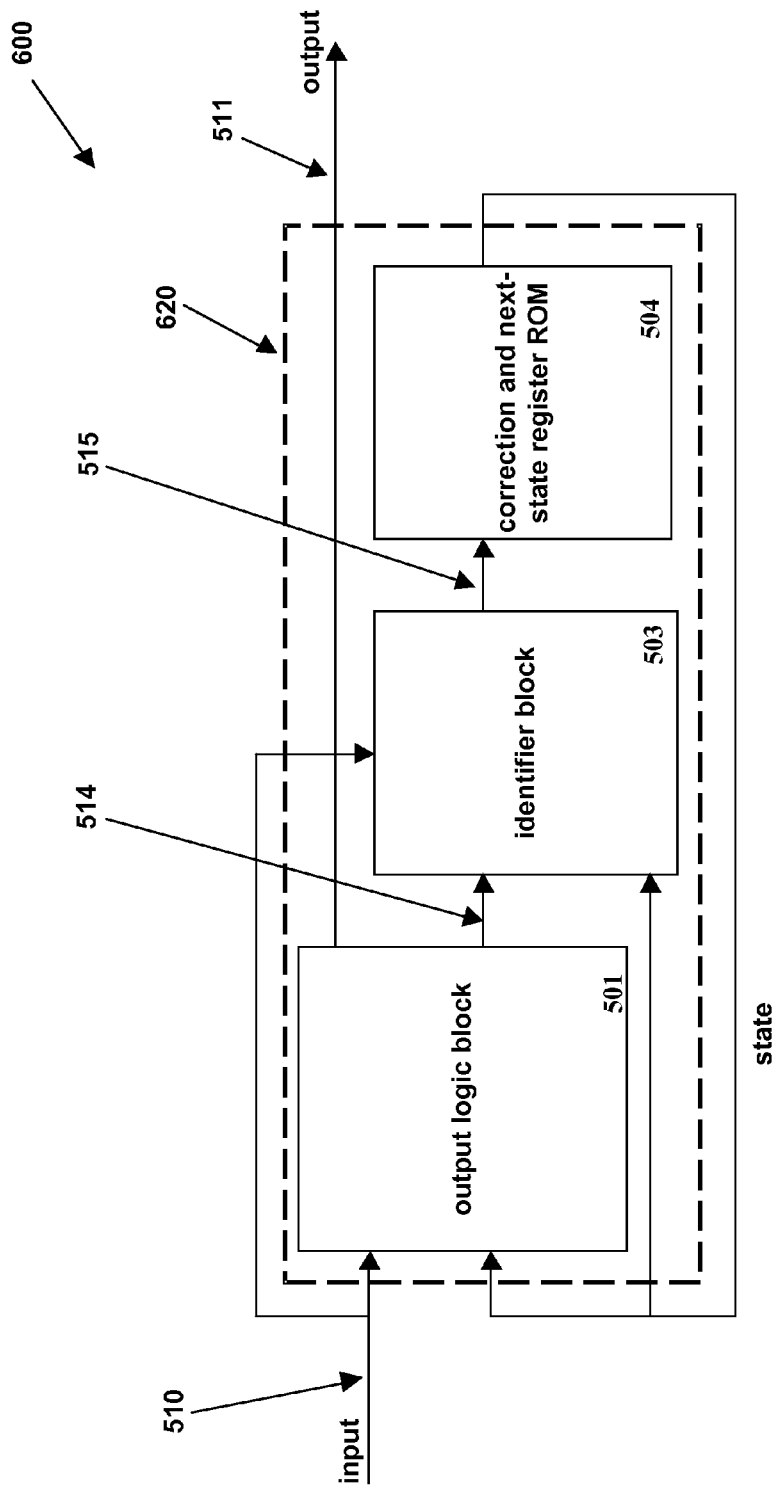

Turning now to FIG. 6, illustrated is a block diagram of an integrated circuit 600 such as a PLD wherein an identifier query/response process represented by the identifier block 503 is integrated into a state machine, constructed according to an embodiment. In this embodiment, the output logic block 501, the identifier block 503, and the correction and next-state register ROM block 504 are integrated into a single structure represented by the block 620. The input and the known current state of the process are employed in a unified structure such as a table in memory to produce an output dependent on the value of an identifier. Such a unified structure would be very difficult to reverse engineer, but would admit automated insertion of inverted bits dependent on identifier bit values.

Thus, as described generally with reference to FIGS. 4, 5, and 6, a user design implemented on an integrated circuit includes a state machine that uses a process with a PUF challenge as an input, and includes a correction ROM. A PUF value is read from the integrated circuit, a value of which is employed to alter a next state of the integrated circuit. The correction ROM is employed to convert the altered next state to a proper value using the value of the PUF.

Figure 7:
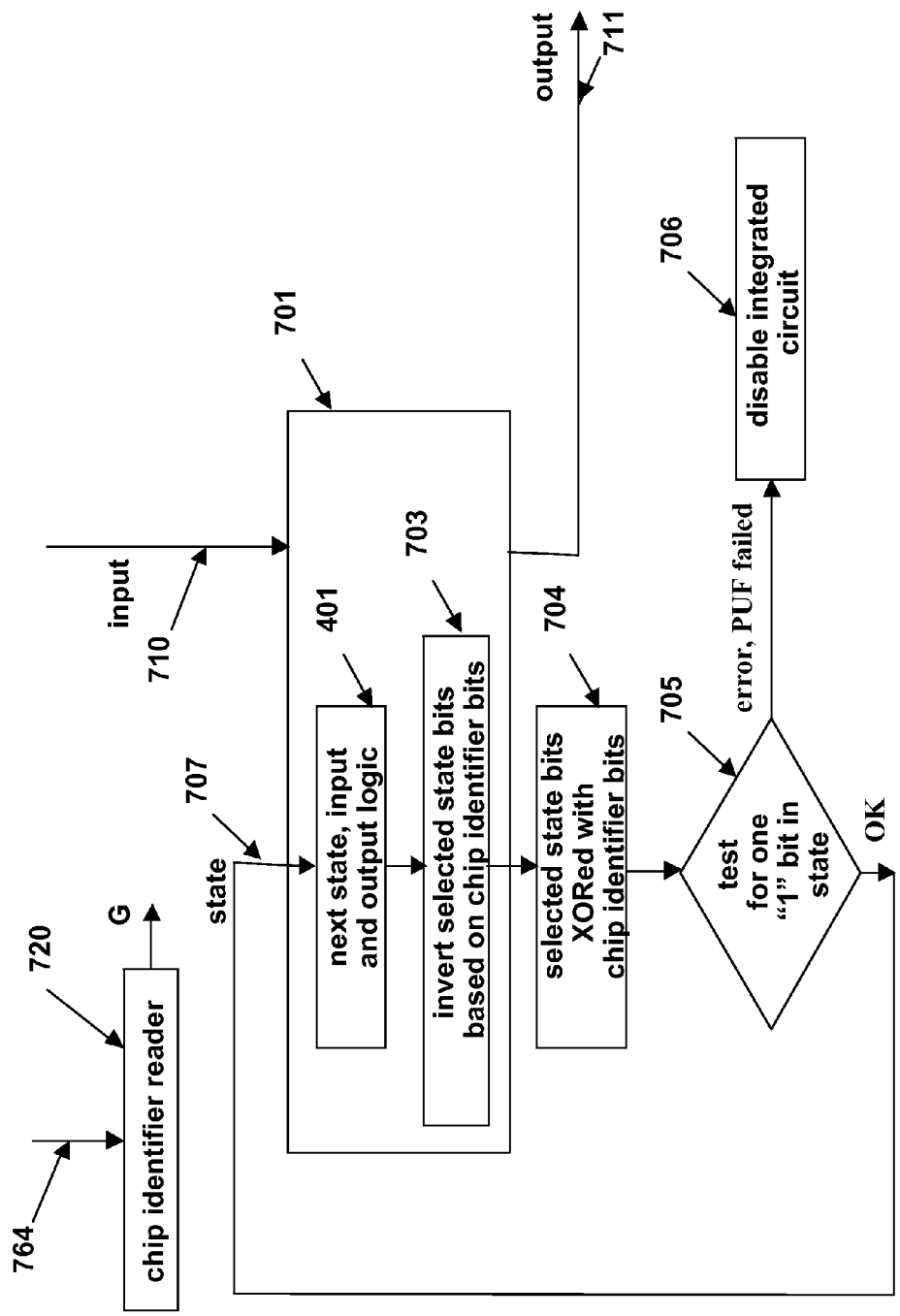
FIG. 7 illustrates a portion of an integrated circuit such as a programmable logic device illustrating a general process including an input, an output, and state bits, wherein an identifier query/response process, which may be applied to only some of the state bits, is integrated into a state machine formed in the integrated circuit, constructed according to an embodiment.

Turning now to FIG. 7, illustrated is a block diagram of a portion of an integrated circuit such as a PLD illustrating a general process including an input 710, an output 711, and state bits 707, wherein an identifier query/response process, which may be applied to only some of the state bits, is integrated into a state machine formed in the integrated circuit, constructed according to an embodiment. The integrated circuit includes an identifier reader 720 to produce a reproducible value G of a chip identifier. In an embodiment, the identifier reader 720 may accept a password from external (from the chip) connection 764. The password may be sent encrypted. The chip identifier may be the password or it may be derived from the password. In an embodiment, the identifier reader 720 may comprise a non-volatile memory. In another embodiment, the identifier reader 720 may comprise a PUF which requires no external connection. The identifier reader 720 may include an error correction process such as an error correction code.

In the embodiment illustrated in FIG. 7, in the logical process represented by block 701, next-state input and output logic block 401 generates next-state and output signals. Selected state bits corresponding to identifier bits with value "1" for a specific chip are inverted in block 703. In block 704, the state bits, possibly including those that are not inverted, are EXCLUSIVE ORed with their corresponding identifier bits. The EXCLUSIVE OR operation in step 704 re-inverts those bits corresponding to state bits that are "1" in the correct chip, while those bits corresponding to identifier bits that are "0" in this chip are also EXCLUSIVE ORed. In the correct chip when the chip identifier bit will be "0," the resulting signal will be unchanged. The next-state logic inverts every bit that has a corresponding "1" in the identifier value. This is simple to do in an integrated circuit such as an FPGA since it involves changing the polarity of the output of look-up table that calculates the value, as shown in the invert selected state bits block 703. Therefore, the state machine is simple to modify on a per-chip basis, and there is no or minimal performance variation due to different identifier values in different devices. There may be minimal performance degradation due to the EXCLUSIVE OR gates inserted. If those EXCLUSIVE OR gates are implemented in a look-up table that has a spare input, they may be inserted without any performance degradation.

If the identifier value is not correct, the corrected state bits will be incorrect, and the state machine will not transition to the correct next state and the state machine will not function correctly. Although this successfully defeats an attempt to run the design in an incorrect chip, it may be desirable to fail more gracefully. In order to detect the error and provide protection for an end user, state encoding is implemented in a known encoding pattern. For example, if one-hot encoding is employed, a test can be added after the EXCLUSIVE OR operation in block 704 to verify that the state is indeed one-hot, as illustrated by inclusion of the test in block 705. The test in block 705 may look for one and only one bit with value "1," as required by the one-hot state representation. The test in block 705 may optionally be included in the integrated circuit. If the test in block 705 fails, then in block 706, the IC is disabled.

Other state encodings can also be easily checked, for example, a two-hot encoding or a parity encoding, e.g., wherein all states are even parity, or an error-correcting code can be used. A choice of a good test may consider the possibility that a significant number of bit errors may be encountered. Thus, an encoding of the state that detects multi-bit failures is desired that is easy to check. Such a code could detect a failure in one cycle. Actually, if a "RESET" state is not properly set, a test in integrated circuit could detect an identifier failure before the first cycle.

Although the error signal may be easy to identify and disable, the inversion of selected bits and the EXCLUSIVE ORs still permit operation of the state machine only in a chip with a correct identifier. An attacker may know that the identifier test has failed, and may be able to determine, for example, that state encoding is one-hot. But this information does not indicate which state bits correspond to which state. The attacker then gains no information about how to defeat the identifier.

Thus, the process illustrated in FIG. 7 and that described later hereinbelow with reference to FIG. 8 can be generally described as including a chip identifier reader in an integrated circuit. A chip identifier is read by the chip identifier reader, and a signal associated with a process in the integrated circuit design is identified. An EXCLUSIVE OR function of the signal is inserted into the integrated circuit to provide an EXCLUSIVE OR function that operates using a bit of the chip identifier produced by the chip identifier reader as an input. The result of the EXCLUSIVE OR function is connected to all destinations of the signal in the integrated circuit. If the bit associated with the chip identifier is "1," then the output of the EXCLUSIVE OR function is inverted at each of its destinations.

In an optional design, steps of the process include compiling the design, choosing a signal based on it being an input to a look-up table with an unused input, or choosing the signal based on it being output of the look-up table with an unused input. The chip identifier may be a PUF, or the chip identifier may be a password that is transmitted to the chip.

Figure 8:
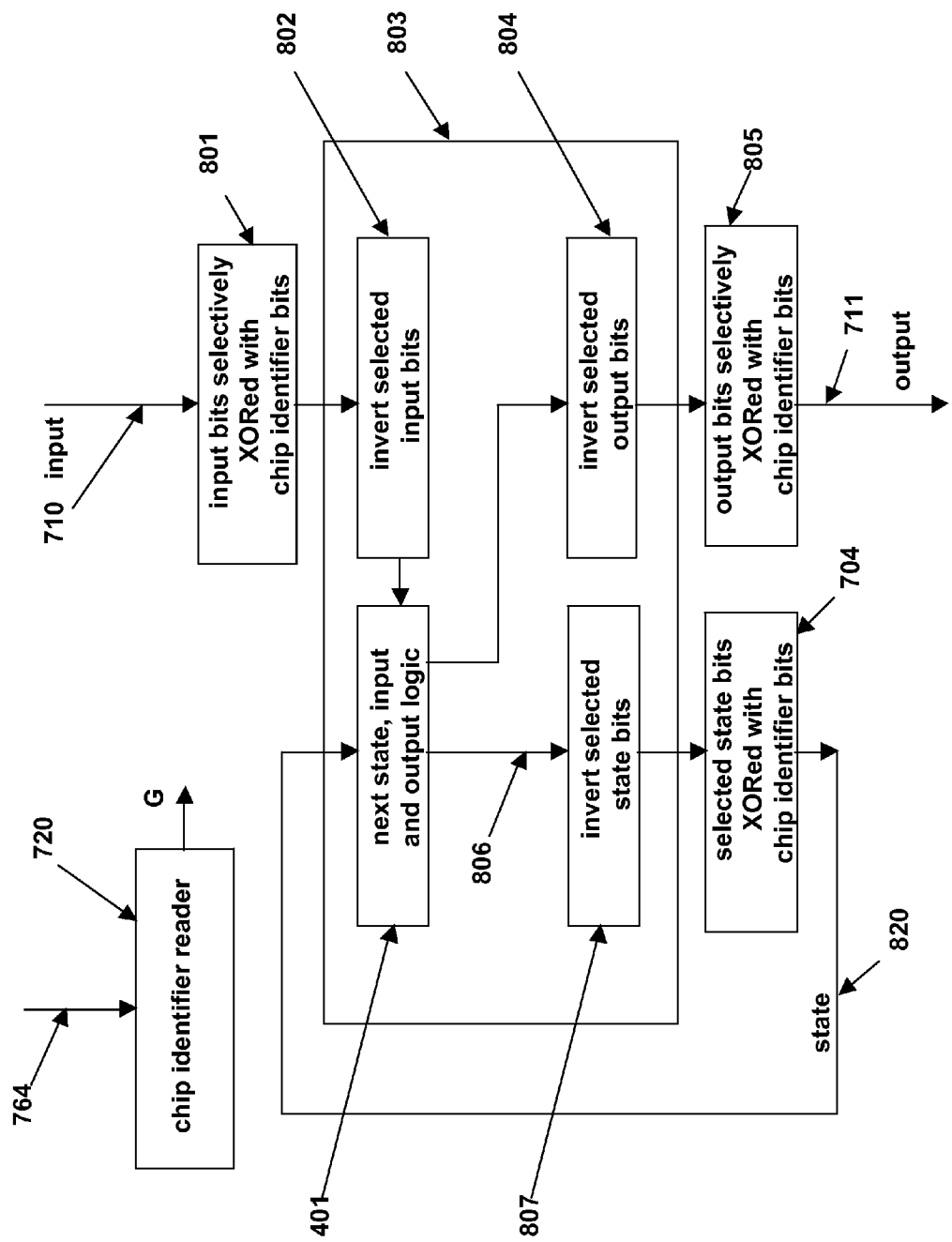
FIG. 8 illustrates a block diagram of a portion of an integrated circuit such as a programmable logic device showing a state machine wherein input data, output data, and internal state data rely on a value of an identifier, constructed according to an embodiment.

Turning now to FIG. 8, illustrated is a block diagram of a portion of an integrated circuit such as a PLD illustrating a state machine wherein input data 710, output data 711, and internal state data 806 rely on the values of an identifier, constructed according to an embodiment. Block 401 represents basic processing performed by the integrated circuit to produce the output 411. Inversion of selected bits of these data according to the value of a respective associated identifier bit for a specific chip may be applied to only some of the indicated bits, and is integrated into the state machine formed in the integrated circuit. In block 801, the input bits are EXCLUSIVE ORed with the respective corresponding identifier bits to selectively invert input bits. Within the block 803, selected input, output, and state bits are inverted in blocks 802, 804, and 807. The output bits and state bits are EXCLUSIVE ORed with the respective corresponding identifier bits in blocks 704 and 805. If those bits are identical to the bits used to invert signals, that is, if the state machine is operating in the same chip from which the chip identifier was taken, then the inverted bits are re-inverted to their correct values in blocks 704 and 805 to produce corrected state data 820 and output data 711. If the chip identifier does not match, some of the result bits of state data and output data will be incorrect and the state machine will function incorrectly, thereby preventing the design from operating in any but the correct chip.

Encoding of the state of the state machine again can be somewhat arbitrary, and such variability among designs does not significantly impact embodiments described herein The blocks 801, 805, and 704 illustrate exemplary locations where the identifier value can be used to selectively invert input, output, or state bits depending on the values of identifier bits. In an embodiment, the process may be applied to only some of the inputs, outputs, and state variables.

For this chip protection process to work, the next-state, input, and output logic must invert every bit that has a corresponding "1" in the identifier for a specific chip. Corresponding bits, possibly including those that are not inverted, are EXCLUSIVE ORed with their corresponding identifier bits. Then in a later step, these bits are re-inverted corresponding to identifier bits that are "1" in the correct chip, while bits corresponding to identifier bits that are "0" in this chip are also EXCLUSIVE ORed. In the correct chip where the identifier bit will be "0," the resulting signal will not be changed. This is simple to do in an integrated circuit such as an FPGA, since it involves changing the polarity of the look-up table that calculates the value of the selected quantity, shown as the "invert selected bits" blocks 802, 804, and 807. Therefore, the state machine is simple to modify on a per-chip basis, and there is no or little performance variation due to different identifier values in different devices. A modest degradation of performance may be introduced due to insertion of the EXCLUSIVE OR gates. If the EXCLUSIVE OR gates are implemented in a look-up table that has a spare input, they may be inserted without any performance degradation.

The result again is no simple "OK" signal to indicate a valid bitstream. To break the protection provided by the identifier, an adversary must reverse engineer the state machine, then deduce how it must have functioned with an all-zeros identifier. With sufficient number of identifier bits, this process is also intractable.

Figure 9:
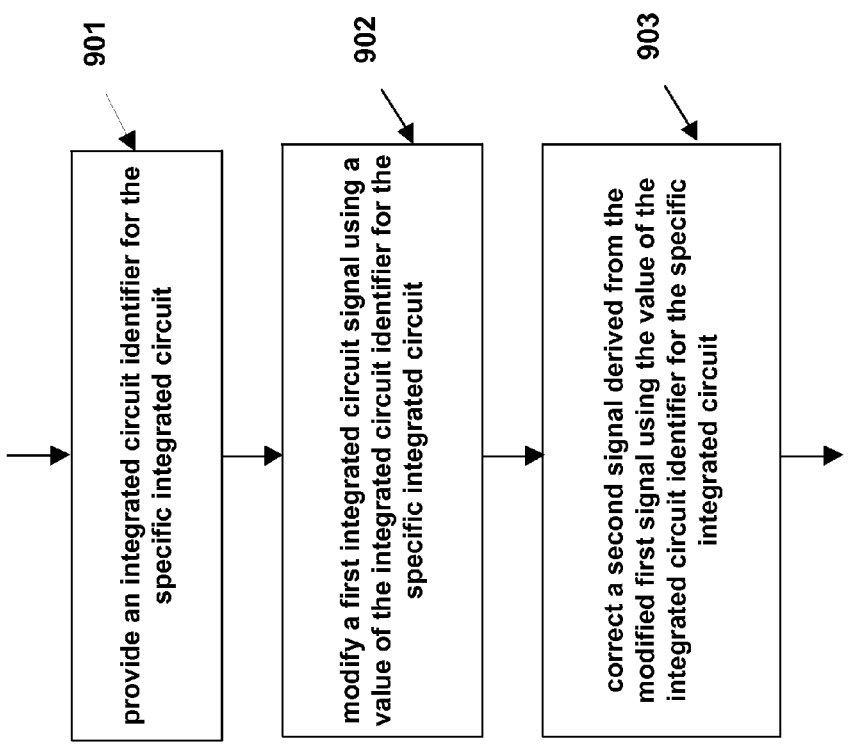
FIG. 9 illustrates a flowchart showing a sequence of steps representing a process that may be employed to form an integrated circuit to prevent unauthorized utilization or reproduction thereof, constructed according to an embodiment.

Turning now to FIG. 9, illustrated is a flowchart showing a general sequence of steps representing processes that may be employed to form an integrated circuit, such as a programmable logic device, to prevent unauthorized utilization or reproduction thereof, constructed according to an embodiment. The sequence of steps utilizes a value of a reproducible integrated circuit identifier formed or stored on the integrated circuit to selectively invert a digital signal or a bit thereof depending on the value of the reproducible integrated circuit identifier. A process to prevent unauthorized utilization or reproduction of the integrated circuit may be implemented as a sequence of one or more steps or as a circuit. It is contemplated that the sequence of steps may be automated to form the integrated circuit. As described hereinbelow, it is further contemplated that a plurality of signals will be modified and corrected using a plurality of values of the integrated circuit identifier to prevent unauthorized utilization or reproduction of an integrated circuit. Modifying and correcting only a single value or only a few values of signals may leave an integrated circuit vulnerable to a determined adversary.

In a first step 901, a process is formed on the integrated circuit to provide a stable value of an integrated circuit identifier. The stable value of the integrated circuit identifier may be produced by applying an error correction code to a PUF value or other means of generating an integrated circuit identifier. In an alternative embodiment, the integrated circuit identifier may be stored in e-fuses or RAM. In a second step 902, a process is formed on the integrated circuit to modify (or integrate) a first signal utilized in the operation of the integrated circuit using a value of the integrated circuit identifier, such as a bit of the integrated circuit identifier. The first signal may be, for example, a design (e.g., a bitstream) or a state value associated with the design such as, for example, a state value of a state machine implemented in the design. In an embodiment, the value of the integrated circuit identifier may be used to modify the first signal by inverting it based on the value of the chip identifier for a specific chip In a third step 903, a process is formed on the integrated circuit to correct a second signal that is derived from the modified first signal using the value of the integrated circuit identifier. The second signal may be corrected by EXCLUSIVE-ORing with the value of the chip identifier or by employing a correction read-only memory that is employed in a state machine calculation. An entry of the read-only memory may be dependent on the value of the integrated circuit identifier. In an embodiment, the second signal may be corrected using an EXCLUSIVE OR function with an input dependent on the value of the integrated circuit identifier.

Processes introduced herein may be formed as a computer program product including a computer usable medium, wherein the computer usable medium has a plurality of computer readable program codes embodied therein to perform the functions described herein of the computer program product.

Figure 10:
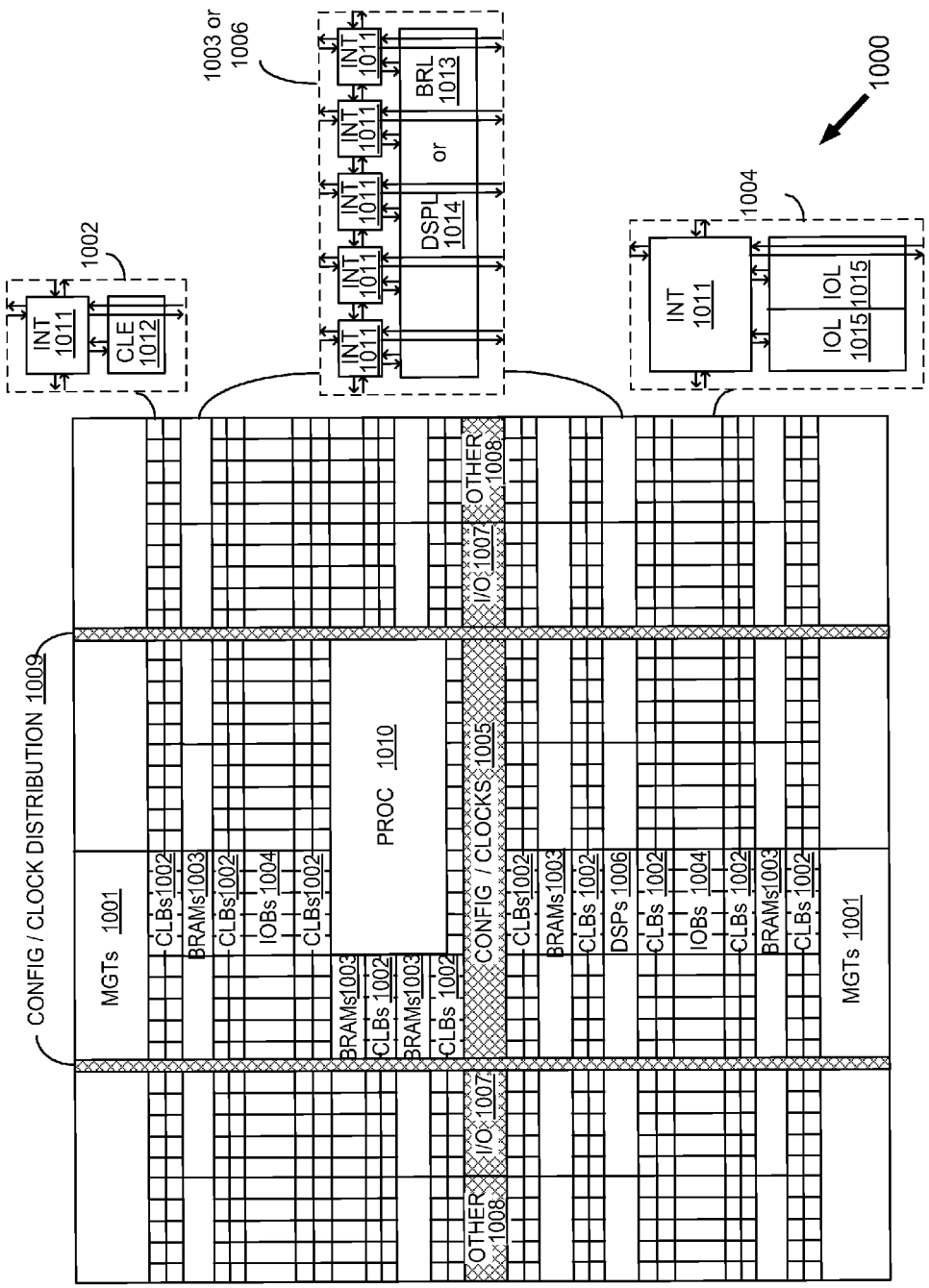
FIG. 10 illustrates an integrated circuit such as an FPGA having programmable logic.

FIG. 10 illustrates an integrated circuit such as an FPGA having programmable logic. An FPGA architecture 1000 has a large number of different programmable tiles including multi-gigabit transceivers (MGTs) 1001, CLBs 1002, BRAMs 1003, IOBs 1004, configuration and clocking logic (CONFIG/CLOCKS) 1005, DSPs 1006, specialized input/output blocks (I/O) 1007 (e.g., configuration ports and clock ports), and other programmable logic 1008 such as digital clock managers, analog-to-digital converters, system monitoring logic, and so forth.

Some FPGAs also include a dedicated processor block (PROC) 1010. While a single processor block is shown, multiple dedicated processor blocks may be employed, where the characterization data may include data related to the speeds of the individual processing blocks. Alternatively, the processor block 1010 may comprise a dual core processor, where the characterization data may include data related to the speeds of the different processor cores, alone or in combination with other timing data. The processor may be a hard processor implemented in fixed hardware elements or a soft processor implemented in programmable elements, such as a Microblaze processor, each of which is commonly available on devices from Xilinx, Inc. The methods of enabling functions of a design to be implemented in an integrated circuit device may include enabling functions of a circuit design in elements of the integrated circuit device or enabling functions implemented by software running on a processor which is an element of the integrated circuit device, or a combination of both. That is, the functions may relate to the operation of a configuration of elements of a circuit design, such as a configuration of elements defined by a configuration bitstream, or functions defined by software running on a processor or the device.

In some FPGAs, each programmable tile includes a programmable interconnect element (INT) 1011 having standardized connections to and from a corresponding interconnect element in each adjacent tile. Therefore, the programmable interconnect elements taken together implement the programmable interconnect structure for the illustrated FPGA. The INT 1011 also includes the connections to and from the programmable logic element within the same tile.

For example, a CLB 1002 may include a configurable logic element (CLE) 1012 that may be programmed to implement user logic plus a single INT 1011. A BRAM 1003 may include a BRAM logic element (BRL) 1013 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers (e.g., four) may also be used. A DSP tile 1006 may include a DSP logic element (DSPL) 1014 in addition to an appropriate number of programmable interconnect elements. An 10B 1004 may include, for example, two instances of an input/output logic element (IOL) 1015 in addition to one instance of the INT 1011. The location of connections of the device is controlled by configuration data bits of a configuration bitstream provided to the device for that purpose. The programmable interconnects, in response to bits of a configuration bitstream, enable connections having interconnect segments to be used to couple the various signals to the circuits implemented in programmable logic, or other circuits such as BRAMs or the processor.

In the pictured embodiment, a horizontal area near the center of the die (shown shaded in FIG. 10) is used for configuration, clock, and other control logic. Vertical areas 1009, extending from this horizontal area, are used to distribute the clocks and configuration signals across the FPGA. Some FPGAs utilizing the architecture illustrated in FIG. 10 include additional logic blocks such as programmable blocks and/or dedicated logic. For example, the processor block PROC 1010 shown in FIG. 10 spans several rows of CLBs and BRAMs. Note that FIG. 10 is intended to illustrate only an exemplary FPGA architecture. The numbers of logic blocks in a row, the relative widths of the rows, the number and order of rows, the types of logic blocks included in the rows, the relative sizes of the logic blocks, and the interconnect/logic implementations included at the top of FIG. 10 are purely exemplary. For example, in an actual FPGA more than one adjacent row of CLBs is typically included wherever the CLBs appear, to facilitate the efficient implementation of user logic. Although processes for producing a chip identifier and related methods have been described for applications to integrated circuits such as PLDs including a configurable logic block, it should be understood that other applications of these processes such as for ASICs in general and other digital programmable devices are contemplated within the broad scope of the invention, and need not be limited to integrated circuit applications such as a PLD including a configurable logic block employing processes introduced herein. As described, a process may be implemented as steps in a computer or other sequential processing device, as a circuit in an integrated circuit such as a PLD, or as other means in an integrated circuit.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A method to protect a design for an integrated circuit ("IC"), comprising:
   generating a unique identifier using an intrinsic characteristic of the IC;
   integrating, based on a value of the unique identifier, the unique identifier with the design; and
   generating an output based upon the integration of the unique identifier, wherein the output is used to implement the design in the IC;
   wherein integrating the unique identifier with the design comprises at least one of:
      EXCLUSIVE ORing a portion of the design with a portion of the unique identifier to produce a result, and inverting the result based on a value of the portion of the unique identifier, wherein the inverting is performed prior to performing a logic operation; or
      EXCLUSIVE ORinq a portion of the unique identifier with an output of user logic to produce a result, and inverting the result based on a value of the portion of the unique identifier, wherein the inverting is performed at a destination of the result.

2. The method of claim 1 further comprising employing an error correction code to correct the unique identifier prior to the integrating the unique identifier with the design or the next state.

3. The method of claim 1 wherein the unique identifier is a physically unclonable function.

4. The method of claim 1 wherein generating the unique identifier comprises generating the unique identifier with a linear feedback shift register.

5. A method to protect a design for an integrated circuit ("IC"), comprising:
   generating a unique identifier using an intrinsic characteristic of the IC; and
   integrating, based on a value of the unique identifier, the unique identifier with a next state associated with the design;
   wherein integrating the unique identifier with the next state comprises:
      inverting the next state based on a value of the unique identifier in order to generate an inverted next state; and
      EXCLUSIVE ORing the inverted next state with the unique identifier to reobtain the next state.

6. The method of claim 5 wherein inverting the next state comprises inverting a bit of the next state if a corresponding bit of the unique identifier has a value of "1".

7. The method of claim 5 further comprising:
   performing a test on the next state to validate the next state; and
   disabling an operation of the IC if the test fails.

8. The method of claim 7 wherein the next state is represented as a one-hot bit sequence, and the test validates that only one bit of the one-hot bit sequence has a value of "1."

9. A method to protect a design for an IC, comprising:
   generating a unique identifier using an intrinsic characteristic of the IC;
   generating a response value based on a state value associated with the design, wherein the response value is a portion of the unique identifier;
   correcting the response value; and
   converting the corrected response value to a next state associated with the design.

10. The method of claim 9 wherein correcting the response value comprises employing an error correction code to correct at least one error in the response value, or detecting the at least one error in the response value and reporting the at least one error.

11. The method of claim 9 wherein converting the corrected response value to the next state of the IC comprises using the corrected response value as an address to a memory, wherein a content of the memory at the address specifies the next state of the IC.

12. The method of claim 9 wherein the state value is a current state or the next state.

13. The method of claim 9 wherein the unique identifier is a physically unclonable function.

14. A system to protect a design for an IC, comprising:
   an identifier reader configured to generate a unique identifier using an intrinsic characteristic of the IC; and
   an integration circuit configured to integrate, based on a value of the unique identifier, the unique identifier with the design or a next state associated with the design, the integration circuit generating an output based upon the integration of the unique identifier, wherein the output is used to implement the design in the IC;
   wherein the integration device includes at least one of the following:

an EXCLUSIVE-OR gate configured to EXCLUSIVE-OR a portion of the design with a portion of the unique identifier; and a user logic coupled to the EXCLUSIVE-OR gate and configured to perform a logic operation, wherein the user logic optionally includes an inverter that is present based on a value of the portion of the unique identifier, wherein the inverter, if present, inverts an output from the EXCLUSIVE-OR gate prior to the user logic performing the logic operation;

a user logic; an EXCLUSIVE-OR gate configured to EXCLUSIVE-OR an output of the user logic with a portion of the unique identifier; and a destination user logic coupled to the EXCLUSIVE-OR gate, wherein the destination user logic optionally includes an inverter that is present based on a value of the portion of the unique identifier, and wherein the inverter, if present, inverts an output from the EXCLUSIVE-OR gate prior to the destination user logic performing a logic operation; or an inverter block configured to invert the state value based on a value of the unique identifier in order to generate an inverted state value; and an EXCLUSIVE-OR device coupled to the inverter block and configured to EXCLUSIVE-OR the inverted state value with the unique identifier.

15. A system to protect a design for an IC, comprising:

an identifier circuit configured to generate a response value based on a state value associated with the design, wherein the response value is a portion of an unique identifier that is generated using an intrinsic characteristic of the IC; and a correction block configured to correct the response value and convert the corrected response value to a next state associated with the design.

16. The system of claim 15 wherein the correction block corrects the response value by employing an error correction code to correct at least one error in the response value, or detecting the at least one error in the response value and reporting the at least one error.

17. The system of claim 15 wherein the state value is a current state or the next state.

\* \* \* \* \*